Nov. 11, 1924.  1,515,052
R. W. JOHNSON
ROTARY VALVE MECHANISM FOR ENGINES
Filed June 29, 1923   2 Sheets—Sheet 1
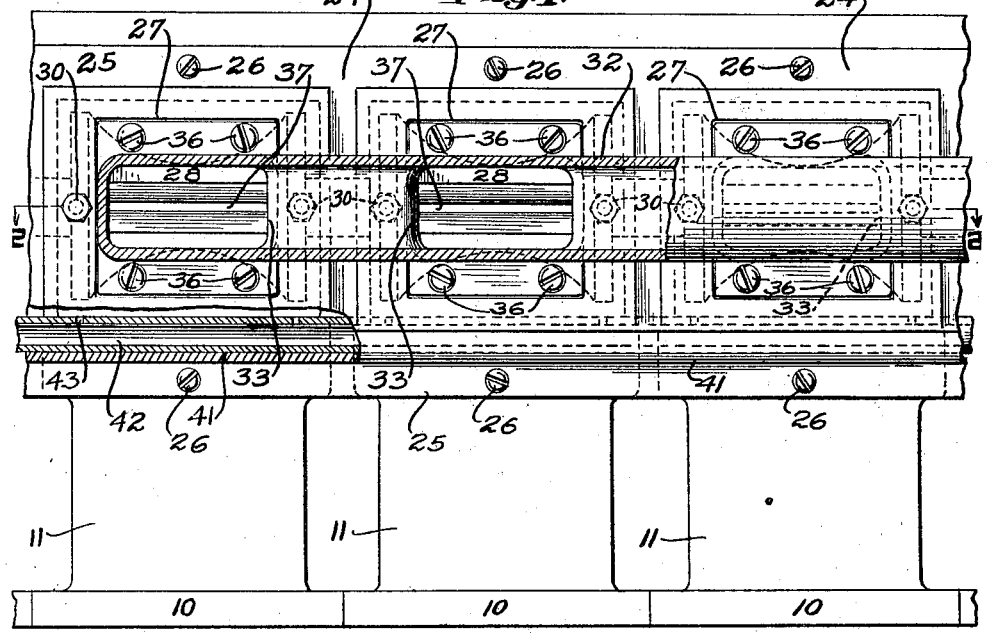
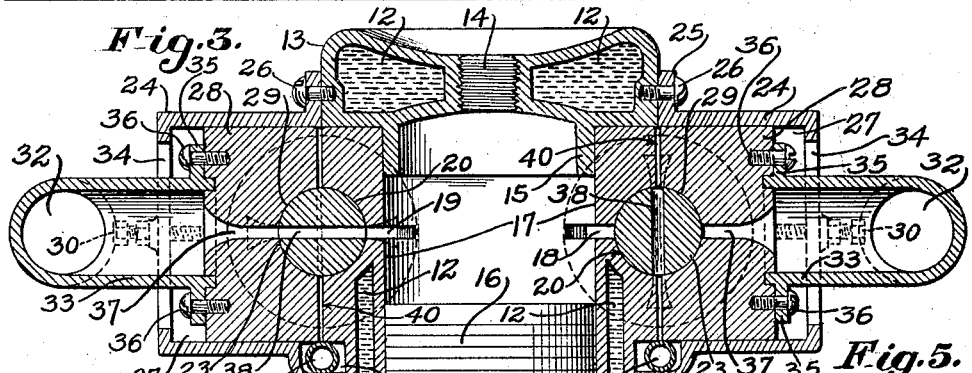
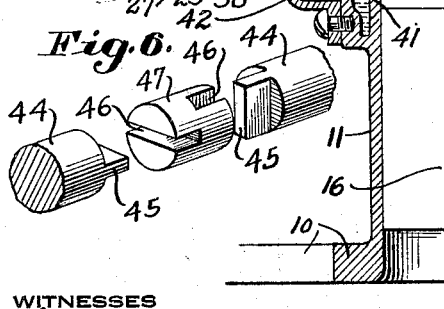
INVENTOR
Richard W. Johnson
WITNESSES
BY
ATTORNEY Nov. 11, 1924.  
R. W. JOHNSON  
ROTARY VALVE MECHANISM FOR ENGINES  
Filed June 29, 1923    2 Sheets-Sheet 2
1,515,052
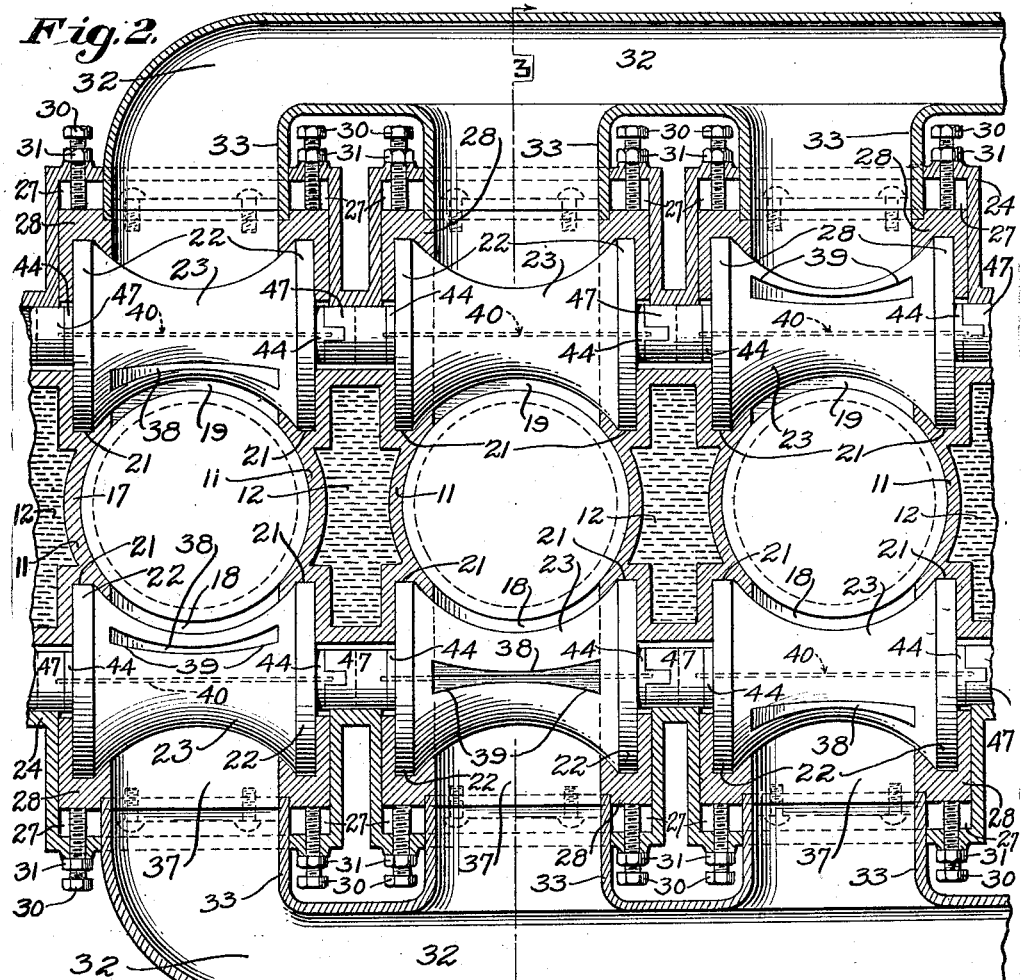
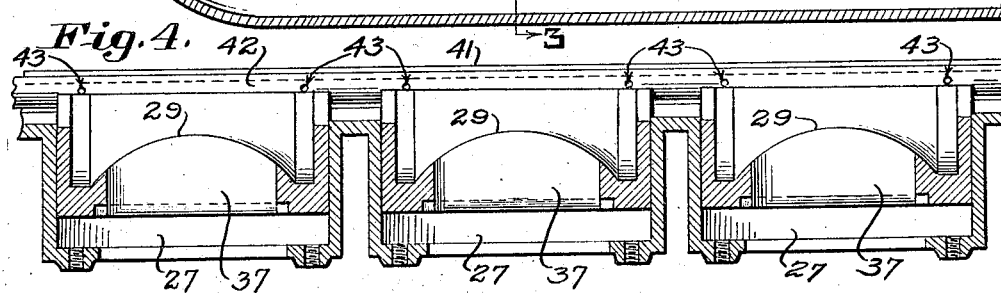
INVENTOR  
Richard W. Johnson  
BY  
ATTORNEY
WITNESSES Patented Nov. 11, 1924.

1,515,052

UNITED STATES PATENT OFFICE.

RICHARD WARREN JOHNSON, OF DANVILLE, PENNSYLVANIA.

ROTARY VALVE MECHANISM FOR ENGINES.

Application filed June 29, 1923. Serial No. 648,607.

*To all whom it may concern:*

Be it known that I, RICHARD WARREN JOHNSON, a citizen of the United States, residing at Danville, in the county of Montour and State of Pennsylvania, have invented a new and useful Rotary Valve Mechanism for Engines, of which the following is a specification.

This invention relates to a rotary valve mechanism, which is especially designed for controlling the inlet and exhaust of internal combustion engines.

The general object of the invention is to provide a valve which is quick acting by reason of its wide extent, and is closely and directly connected with the cylinder, whereby a small combustion chamber with high compression is practicable and maximum efficiency is obtained.

In carrying out my invention, each cylinder is provided with rotary inlet and exhaust valves of similar construction and arranged on opposite sides thereof, with their axes in a plane perpendicular to the longitudinal axis of the cylinder, each valve being substantially in the shape of a spool, whose lateral surface is developed by the arc of a circle with the convex side toward the axis of the valve, so that the side of the valve conforms closely to the circumference of a cross section of the cylinder.

The structural details of the invention will be more specifically explained in connection with the accompanying drawings, which illustrate the invention in its preferred form.

In the drawings:

Figure 1 is a side view, partly in elevation and partly in section, of a portion of an engine embodying the invention.

Figure 2 is a horizontal sectional view thereof, taken on the line 2—2 of Figure 1.

Figure 3 is a transverse section taken on the line 3—3 of Figure 2.

Figure 4 is a sectional view through the housing and boxing which holds the valves.

Figure 5 is a detail view of one of the bearing blocks for the valve.

Figure 6 is a display view of one of the couplings connecting the valves of different cylinders.

The invention is adapted to be used on an engine having any number of cylinders, and in the drawings there is shown a cylinder block 10 in which are formed the cylinders 11, separated in the usual manner by water jackets 12. A head block 13 is rigidly secured to the upper ends of the cylinders 11, and is provided with a threaded opening 14 leading into each cylinder for receiving a spark plug, while a flange 15 extends downwardly into the cylinder to secure the head firmly against displacement. Cooperating with each cylinder in the usual piston 16.

The upper ends of the cylinders form combustion chambers. The walls 17 of these chambers are provided with opposed ports 18 and 19, one of which constitutes the inlet port, and the other the exhaust port. These ports, as will be seen from the drawings, are in the form of slots extending transversely across opposite sides of the cylinder to approximately the entire width of the cylinder. It will be noted that the inlet manifold, valves and ports are similar in every respect to the outlet manifold, valves and ports. The outer face of the wall 17, opposite each port, is arcuate in cross section, as shown at 20, and is also arcuate longitudinally on a line concentric with the respective cylinders. At each side of the port, however, an annular seat or bearing 21 is formed to receive the heads 22 of the spool-shaped rotary valve 23.

On each side of the engine a housing 24 is secured by means of lateral flanges 25 and suitable screws 26 or the like, and this housing contains a box 27 opposite each valve, within which is an adjustably mounted bearing block 28 formed with a bearing surface 29 complimentary to the bearing surface 20 for rotatably receiving the valve 23. Each block 28 may be adjusted to compensate for wear on the valves by means of screws 30 and lock nuts 31. The inlet and exhaust manifolds 32 are connected to opposite sides of the engine and provided with branches 33 for each cylinder. Openings 34 are provided in the housing 24, through which the branches 33 may be inserted, and the manifolds are secured to the respective bearing blocks 28 by means of flanges 35 and screws 36, or the like. Each bearing block 28 is provided with a slot 37 in alinement with the port 18 or 19 and leading into the branch 33 of the manifold. The valve is provided with a diametric slot 38, which is adapted to uncover and establish communication between the respective ports and the inlet and exhaust manifolds at the proper time through the operation of the engine, as will be readily understood by those skilled in the art. It is to be noted that the diameter of each valve increases from its center toward either end, and it is therefore preferable to flare the outer portions of the slots 38, as shown at 39, so that the respective ports 18 and 19, as well as the slot 37 through the bearing block 28 may be covered and uncovered simultaneously throughout the entire length of the valve. The block 28 is initially spaced slightly from the walls 17, as shown at 40, in order to permit the bearings to be taken up to compensate for wear. The space 40 also provides means for lubricating the valve. For supplying oil thereto, one side of the housing 24 is formed with a gutter 41, within which is an oil tube 42 connected with the oiling system of the engine and provided with perforations 43 opposite the heads 22 of the valves. Oil is thus introduced into the bearings, and all excess will drain downwardly into the gutter 41.

While all of the valves 23 will be substantally in alinement, each one must be fitted to its seat, and the bearings will from time to time be adjusted to compensate the wear, so that it is necessary to provide a flexible connection. Each valve, therefore, is provided with a shaft portion 44 having a tenon 45, which fits into a corresponding slot 46 of a magneto coupling member 47. This connection permits all of the valves to maintain their relative angular relation and to be rotated simultaneously, and yet permits the required flexibility. It is to be understood that the relative angular positions of the several valves is arranged so that the intake and exhaust of the respective cylinders will take place in proper sequence, according to the number of cylinders in the engine.

In the operation of the valve mechanism it will be seen that the inlet and exhaust ports are covered and uncovered throughout their entire length, which is substantially equal to the internal diameter of the cylinder, so that the stream of fuel or exhaust flows quickly into or out of the cylinder, and thus makes a very quick acting valve. As a consequence of this, a small combustion chamber with high compression and high speed is possible.

While I have shown and described in detail all of the features of the invention, it will be readily understood that many modifications may be made therein without departing from the principles of the invention, and it is my intention, therefore, to include all such modifications within the scope of the appended claims.

What is claimed is:

1. In an internal combustion engine, the combination of a cylinder having opposed transverse slots forming inlet and exhaust ports, rotary spool-shaped slotted valves for said ports having their axes in a plane perpendicular to the longitudinal axis of the cylinder, the lateral surface of said valves being curved longitudinally so that each element thereof forms an arc having substantially the same radius of curvature as the outer face of the cylinder wall.

2. In an internal combustion engine, the combination of a cylinder having opposed transverse slots forming inlet and exhaust ports, said slots being substantially coextensive in length with the internal diameter of the cylinder, spool-shaped rotary valves for said ports having their axes in a plane perpendicular to the longitudinal axis of the cylinder, the outer face of the cylinder being so formed as to provide a bearing for said valves, said valves having slots therethrough coextensive in length with the ports and with the internal diameter of the cylinder, the lateral surface of said valves being curved longitudinally so that each element thereof forms an arc having substantially the same radius of curvature as the cylinder wall.

3. In an internal combustion engine, the combination with a cylinder having a transverse slot forming a port, of a rotary valve extending transversely of the cylinder adjacent said port, the outer face of the cylinder wall being formed to provide a bearing for the valve, the valve being circular in cross section with the diameter increasing toward the ends to correspond with the curvature of the cylinder wall, said valve having a longitudinal slot adapted to register with said port during a part of its rotation, the sides of the slot being flared outwardly toward the ends of the valve substantially in proportion to the diameter of the valve.

4. In an internal combustion engine, the combination of a cylinder block having a plurality of cylinders with oppositely disposed inlet and outlet ports, a housing secured to each side of the cylinder block and having boxes therein, bearing blocks within the boxes cooperating with the outer surfaces of the cylinder walls to form bearings, the axes of which are in a plane perpendicular to the axes of the cylinders, rotary valves mounted in said bearings and controlling said ports, the diameter of each valve increasing toward its ends to correspond with the curvature of the cylinder wall, each valve having a longitudinal slot adapted to register with a corresponding port of the cylinder, the sides of said slot being flared outwardly toward the ends of the valve substantially in proportion to the diameter of the valve.

5. In an internal combustion engine, the combination of a cylinder block having a plurality of cylinders with opposed inlet and outlet ports, a housing secured to each side of the cylinder block and having boxes therein, bearing blocks slidably mounted within the boxes and cooperating with the outer surfaces of the cylinder walls to form bearings, with the diameter of said bearings increasing from the center thereof toward the ends, spool-shaped rotary valves mounted in said bearings and controlling the ports, means mounted in said housing for independently adjusting said bearings, and flexible couplings connecting the valves and holding the same in predetermined angular relation to each other and permitting the bearings to be adjusted independently.

In testimony, that I claim the foregoing as my own, I have hereto affixed my signature.

RICHARD WARREN JOHNSON.